United States Patent

Kobayashi et al.

[11] Patent Number: 6,034,693
[45] Date of Patent: Mar. 7, 2000

[54] IMAGE SYNTHESIZING APPARATUS, IMAGE SYNTHESIZING METHOD AND INFORMATION STORAGE MEDIUM

[75] Inventors: Takeharu Kobayashi, Yamato; Komei Kato, Yokohama; Masaki Takeda, Tokyo, all of Japan

[73] Assignee: Namco Ltd., Tokyo, Japan

[21] Appl. No.: 08/826,308

[22] Filed: Mar. 27, 1997

[30] Foreign Application Priority Data

May 28, 1996  [JP]  Japan ................................... 8-156049

[51] Int. Cl.[7] .................................................. G06F 15/00
[52] U.S. Cl. ........................................................ 345/430
[58] Field of Search .................................. 345/429, 430, 345/433, 441, 426, 427

[56] References Cited

U.S. PATENT DOCUMENTS 5,550,960  8/1996  Shirman et al. .......................... 395/130
5,761,401  6/1998  Kobayashi et al. ...................... 395/130
5,812,141  9/1998  Kamen et al. ........................... 395/130

FOREIGN PATENT DOCUMENTS 6-4646  1/1994  Japan .

Primary Examiner—Phu K. Nguyen
Attorney, Agent, or Firm—Oliff & Berridge, PLC

[57] ABSTRACT

An image synthesizing apparatus, an image synthesizing method and an information storage medium which can realize the representation of the front and back sides of a primitive surface while decreasing processing load. Whether the front or back side of a polygon (primitive surface) is to be displayed on a screen is judged. When the front side of the polygon is to be displayed, a first texture is mapped (on the polygon). On the other hand, if the back side of the polygon is to be displayed, a second texture is mapped (on the polygon). Thus, a realistic representation can be accomplished without increasing processing load. Depending on whether the front or back side of the polygon is to be displayed, various image information such as color palette, vertex brightness information, normal vector information lighting model parameter information and transparency information may be varied.

20 Claims, 14 Drawing Sheets

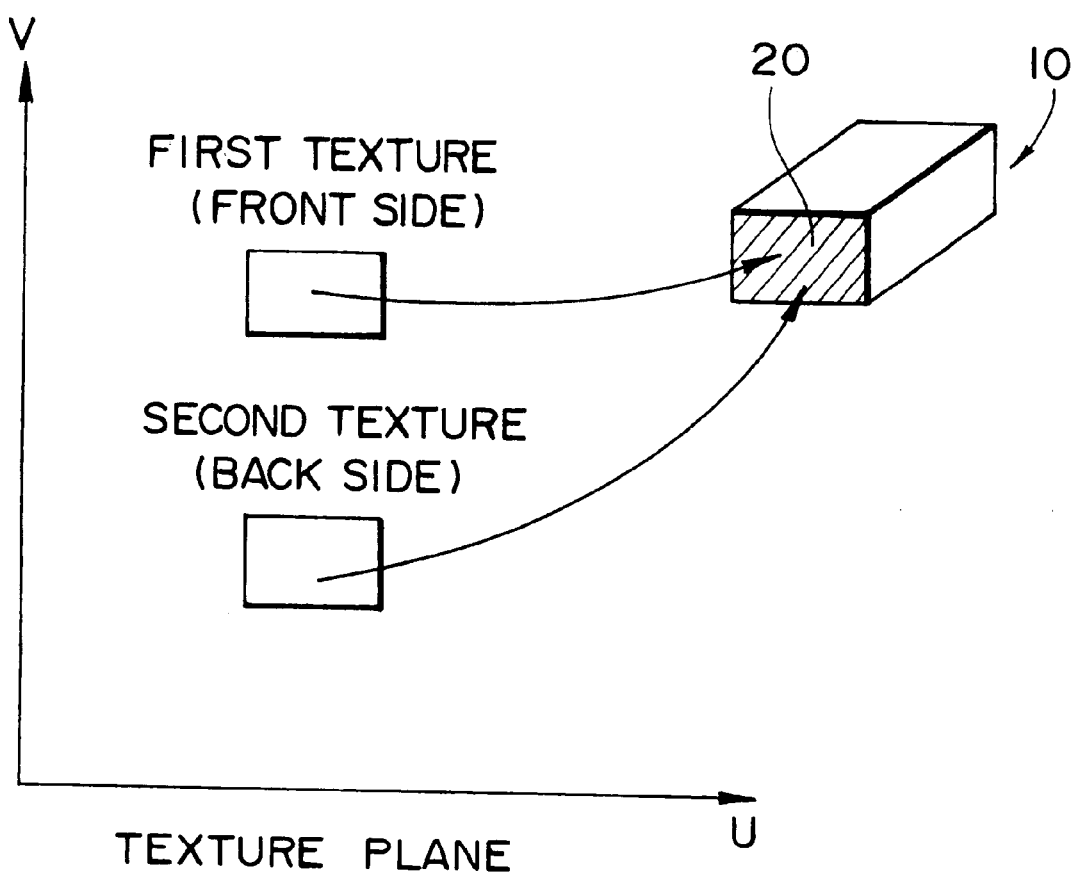

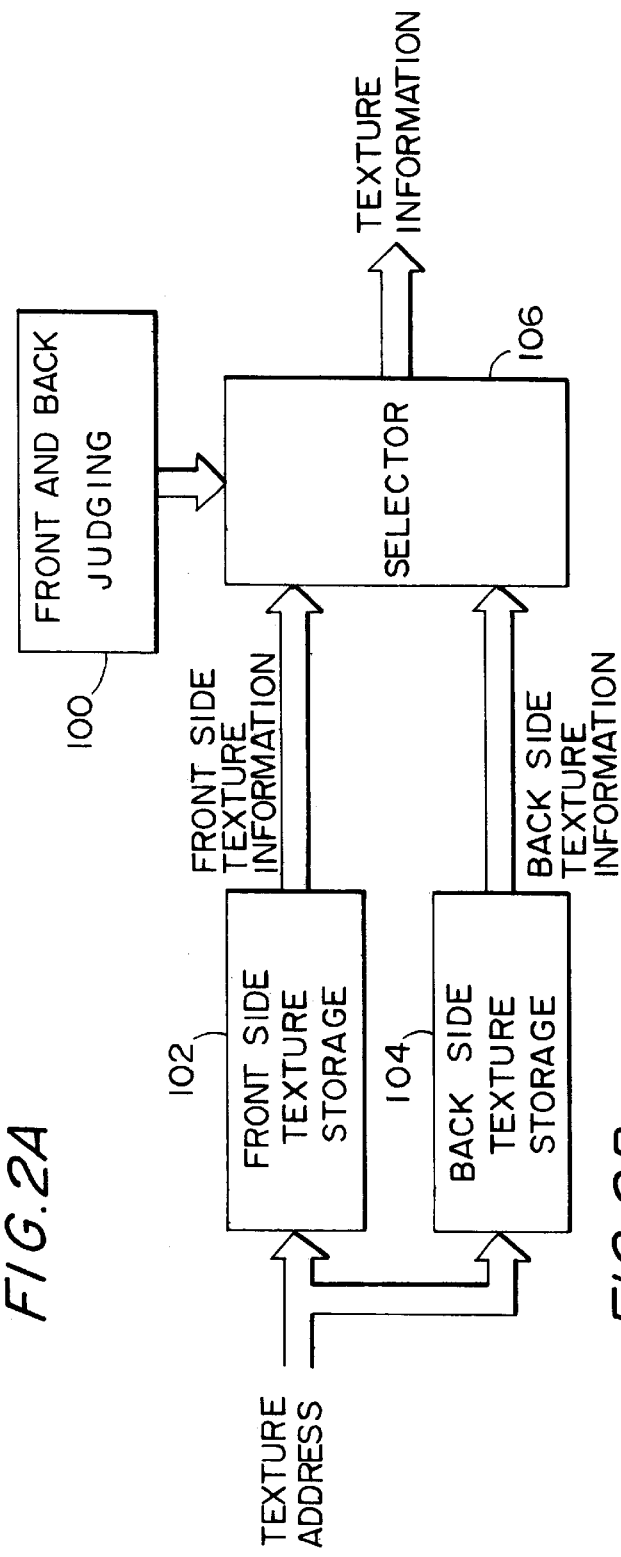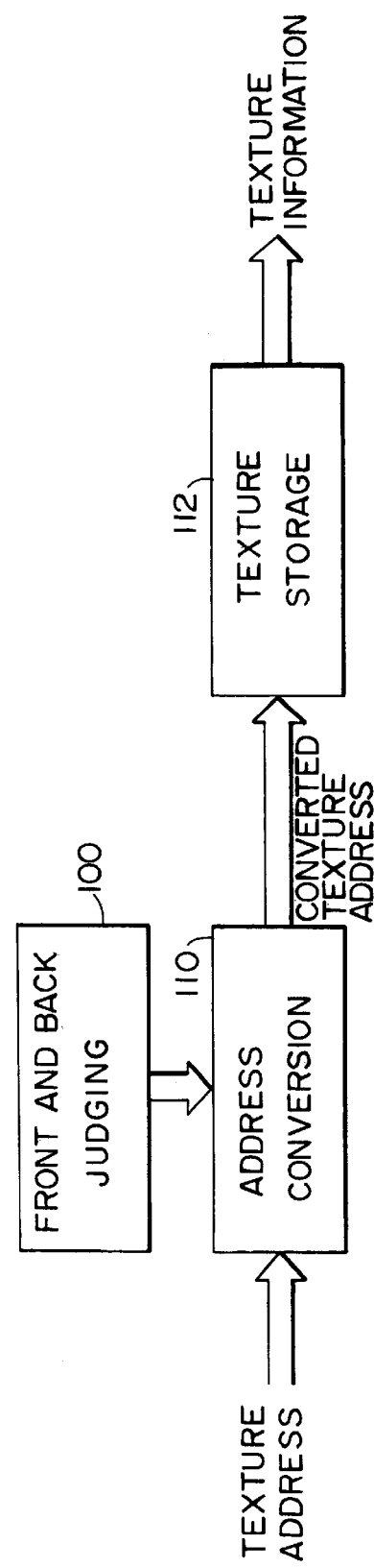

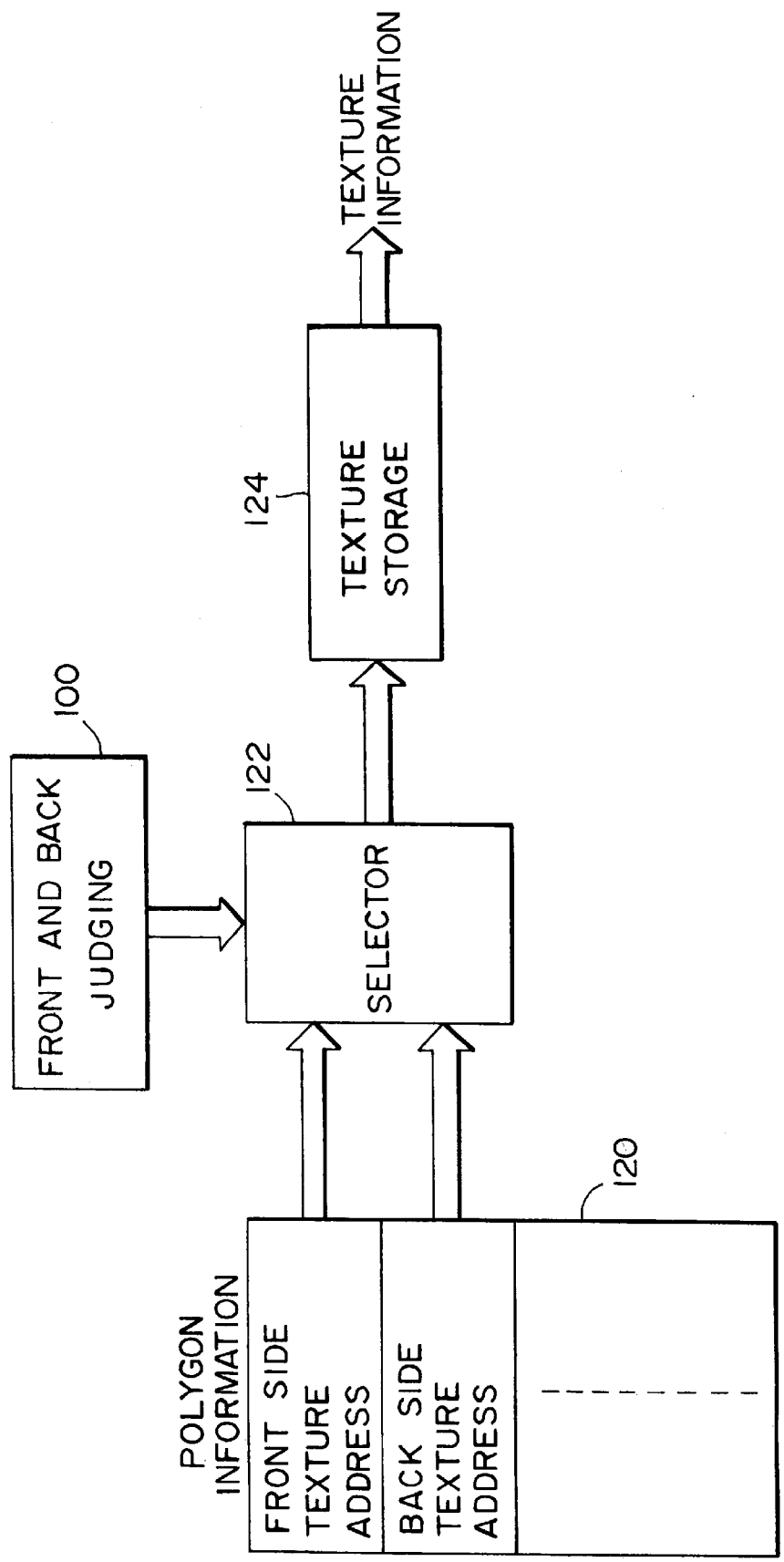

FIG. 4

FIRST COLOR PALETTE (FRONT SIDE)

| COLOR CODE | R | G | B |
|---|---|---|---|
| ⋮ | ⋮ | ⋮ | ⋮ |
| 45 | 20 | 40 | 60 |
| ⋮ | ⋮ | ⋮ | ⋮ |

⇒ RGB OUTPUT

COLOR CODES

SECOND COLOR PALETTE (BACK SIDE)

| COLOR CODE | R | G | B |
|---|---|---|---|
| ⋮ | ⋮ | ⋮ | ⋮ |
| 45 | 40 | 60 | 20 |
| ⋮ | ⋮ | ⋮ | ⋮ |

⇒ RGB OUTPUT

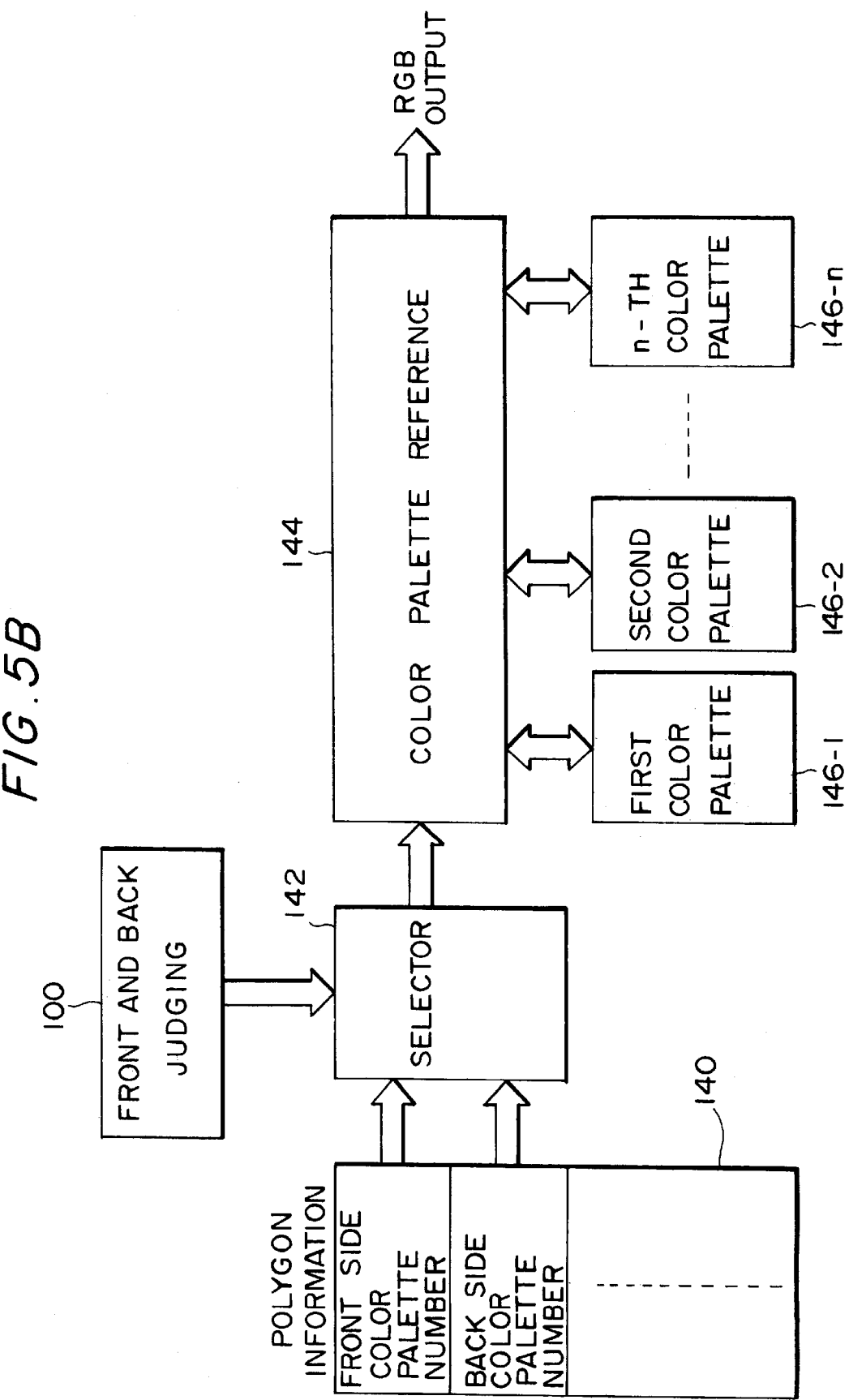

FRONT SIDE

BACK SIDE

IMAGE SYNTHESIZING APPARATUS, IMAGE SYNTHESIZING METHOD AND INFORMATION STORAGE MEDIUM

BACKGROUND OF THE INVENTION

1. Technical Field

The present invention relates to an image synthesizing apparatus, an image synthesizing method and an information storage medium.

2. Description of the Related Art

There are known many types of image synthesizing systems in which an object to be displayed is formed by polygons(primitive surfaces), such objects being used to synthesize an image. For example, in a three-dimensional racing game system, polygons are used to form other racing cars, guard-rails, signboards, roads, etc. to be displayed on a screen. A player operates its racing car using given operating means (steering wheel, accelerator pedal, game controller and others) for enjoying a car race with the other racing cars. In such an image synthesizing system, the viewpoint and sight line of the player vary depending on the operation of the player. This causes such a situation that the back side of the polygons will be displayed on the screen. Assuming a case that a signboard formed by polygons is to be displayed on the screen, the front side of the polygons is only displayed on the screen when a racing car on the screen goes forward. If the racing car on the screen goes backward, the back side of the polygons will be displayed.

In an image synthesizing system of such a type that the back side of the polygons will not be displayed on the screen, for example, a signboard will vanish from the player's field of view instantly when the player's racing car is turned to the reverse direction. This is very unnatural for the player.

On the other hand, another image synthesizing system of such a type that faces of a pair of polygons each used to form the back and front side of a signboard to be displayed are put together, raises another problem in that the number of polygons used to form an object is duplicated. Such an image synthesizing system is required to provide a real-time operation in which an image is synthesized in real time for the player's operation. When the number of polygons to be processed is increased, the processing load is correspondingly increased. Thus, the real-time operation will not be maintained, resulting in deterioration of the image quality.

SUMMARY OF THE INVENTION

In view of the aforementioned technical problems, the present invention is made and has its object to provide an image synthesizing apparatus, an image synthesizing method and an information storage medium which can be used to realize the display of front and back sides of primitive surfaces without increasing processing load so much.

To this end, the present invention provides an image synthesizing apparatus for generating an image including objects each of which is formed by at least one primitive surface comprising:

means for judging whether the front or back side of the primitive surface should be displayed on a screen; and means for mapping a first texture to the primitive surface when the front side thereof is to be displayed and for mapping a second texture to the primitive surface when the back side thereof is to be displayed.

According to the present invention, different textures are mapped to the primitive surface depending on whether the front or back side of the primitive surface is to be displayed. Thus, the front and back sides of a primitive surface can be realized without putting faces of two primitive surfaces together, resulting in a realistic representation without increasing processing load. Depending on primitive surface type or other factor, the same texture may be used for the front and back sides of a primitive surface. Alternatively, the back side of a primitive surface may be omitted for display. The scope of the present invention also includes the mapping of one texture to a plurality of primitive surfaces.

The present invention also provides an image synthesizing apparatus for generating an image including objects each of which is formed by at least one primitive surface comprising:

means for judging whether the front or back side of the primitive surface should be displayed on a screen; and means for forming an image of the primitive surface by referring to a first color palette through a color code when the front side thereof is to be displayed and for forming an image of the primitive surface by referring to a second color palette through a color code when the back side thereof is to be displayed.

According to the present invention, different color palettes are referred to form different images for the front and back sides of the primitive surface. Thus, a color which cannot be used to display the front side of the primitive surface may be used to display the back side of the primitive surface.

The present invention further provides an image synthesizing apparatus for generating an image including objects each of which is formed by at least one primitive surface comprising:

means for judging whether the front or back side of the primitive surface should be displayed on a screen; and means for computing the brightness of the primitive surface by using at least one of vertex brightness information, normal vector information and lighting model parameter information and for varying the brightness information, the normal vector information and the lighting model parameter information depending on whether the front or back side of the primitive surface is to be displayed.

According to the present invention, the brightness of the primitive surface can be varied depending on whether the front or back side of a primitive surface is to be displayed. Thus, for example, the front side of the primitive surface may be more brightened than the back side of the same primitive surface. In addition, varied shading conditions may be obtained in Gouraud shading or Phong's smooth shading.

The present invention further provides an image synthesizing apparatus for generating an image including objects each of which is formed by at least one primitive surface comprising:

means for judging whether the front or back side of the primitive surface should be displayed on a screen; and means for varying image information used to form an image of the primitive surface depending on whether the front or back side of the primitive surface is to be displayed. Thus, the front and back sides of an object can be represented with reality and without increasing the number of a primitive surface to be used. In such a case, it is desirable that the image information may be at least one of texture information, information for determining texture, color palette information, information for determining color palette, brightness information, information for determining brightness, transparency information and information for determining transparency.

In the present invention, it is desirable that the primitive surface may be a polygon, when priority to simplicity and speed of the image synthesizing processing is given. However, primitive surface can be various types such as a curved surface (free-form surface), a complicated surface and the like other than a polygon.

BRIEF DESCRIPTION OF THE DRAWINGS

FIG. 1 is a view illustrating the principle of a first embodiment of the present invention.

FIGS. 2A, 2B and 2C are block diagrams illustrating various configurations for realizing the first embodiment.

FIG. 4 is a view illustrating the principle of a second embodiment of the present invention.

FIGS. 5A and 5B are block diagrams illustrating various configurations for realizing the second embodiment.

DETAILED DESCRIPTION OF THE PREFERRED EMBODIMENTS

Figure 3A:
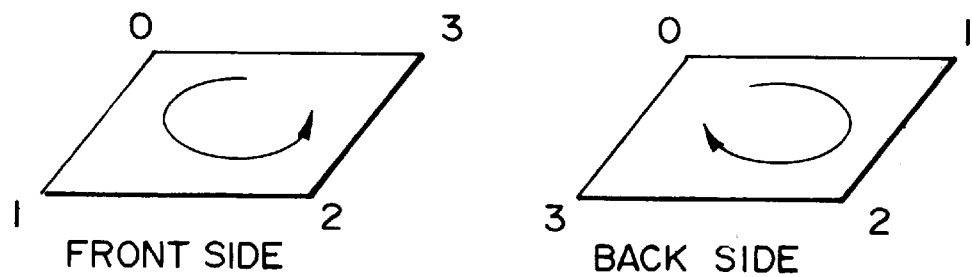
FIGS. 3A and 3B are views illustrating the judgment of front and back sides for a polygon.

Some preferred embodiments of the present invention will now be described with reference to the drawings. In the following description, it is assumed that the primitive surface is polygon. However, in the present invention, the primitive surface is not limited to the polygon. The primitive surface can be various types such as a curved surface (free-form surface) a complicated surface and the like other than the polygon.

(First Embodiment)

FIG. 1 shows a view illustrating the principle of a first embodiment of the present invention. An object to be displayed 10 is formed by a plurality of polygons. Letters U and V represent coordinates in a texture plane. In this embodiment, for example, it is first judged whether the front or back side of a polygon 20 is to be displayed on a screen. If it is judged that the front side of the polygon is to be displayed, a first texture (texture for the front side) is mapped to the polygon 20. On the other hand, if it is judged that the back side of the polygon is to be displayed, a second texture (texture for the back side) is mapped to the polygon 20. Thus, the front and back sides of the polygon can be realized by a single polygon without increasing processing load. On the contrary, in a system which the back side of a polygon cannot be displayed, the polygon will instantly vanishes when the polygon is reversed. It does not provide a sense of reality. In a system which faces of two polygons are put together to form both the front and back sides surface of the object, two polygons are required to form one surface with increase of the number of polygons to be processed, resulting in increase of processing load. On the contrary, this embodiment of the present invention can realize the realistic representation of the front and back surface of an object without increasing processing load.

FIGS. 2A, 2B and 2C show functional block diagrams of various configurations in which the principle of FIG. 1 can be realized. In the configuration of FIG. 2A, front and back side texture information is read out from front and back side texture storage units 102 and 104, based on a texture address (which corresponds to the physical address of coordinates U and V in FIG. 1). The read information is then inputted into a selector 106. A front and back judging unit 100 judges whether the front or back side of a polygon is to be displayed on a screen. The selector 106 selects the front side texture information when the front side of the polygon is to be displayed or the back side texture information when the back side of the polygon is to be displayed. The selected texture information is then outputted from the selector 106.

Various techniques for judging the front and back sides of the polygon may be taken in the present invention. In a first technique, as shown in FIG. 3A, vertex numbers have been previously provided to the respective vertices of a polygon. The displayed face of the polygon is judged to be front or back side depending on whether these vertex numbers are sequentially followed anti-clockwise or clockwise. A second technique computes the vector product of the vertex coordinates in a polygon. The vector product is determined in respect to its plus or minus Z-coordinate. The result is used to judge the front or back side of the polygon. This corresponds to determination of the direction of the normal vector in the polygon surface. A third technique is such that if a moving body 22 manipulated by a player (whose viewpoint follows the moving body) is outside of a dome 24, it is judged that the polygon forming the dome 24 is the front side. Thus, the front side of the polygon is displayed. If the moving body 22 is inside of the dome 24, it is then judged that the polygon to be displayed is the back side. Thus, the back side of the polygon is displayed. In such a manner, a single polygon is only used to represent the dome 24 without putting faces of two polygons together.

The judgment of the front and back sides of the polygon is not limited to the aforementioned three techniques, but may be carried out through any of various other techniques. Although it is generally desirable that the texture information is color information such as color codes or the like, any other information such as translucent information, brightness information, surface shape information (e.g., normal vector information or displacement information), reflectance information, index of refraction information, depth information or the like can be applied.

The configuration shown in FIG. 2B inputs a texture address to an address conversion unit 110. The front and back judging unit 100 judges whether the front or back side of a polygon is to be displayed on a screen. If the front side of the polygon is to be displayed, the address conversion unit 110 converts the inputted texture address into a front side texture address. On the contrary, if the back side of the polygon is to be displayed, the address conversion unit 110 converts the inputted texture address into a back side texture address. In any event, the converted texture address is then outputted toward a texture storage unit 112. Thus, the texture storage unit 112 will output texture information corresponding to the front or back side of the polygon.

The configuration of FIG. 2C causes each polygon to have both the front and back side texture addresses as polygon information 120. A selector 122 selects either of the front or back side texture address according to the judgment of the front and back judging unit 100. The selected texture address is then outputted toward the texture storage unit 124 which will in turn output texture information corresponding to the front or back side of the polygon.

It will be understood that any other configuration for realizing the principle of FIG. 1 other than those of FIGS. 2A–2C may be applied to the present invention if it can map different textures for the front and back sides of the polygon.

(Second Embodiment)

Figure 3B:
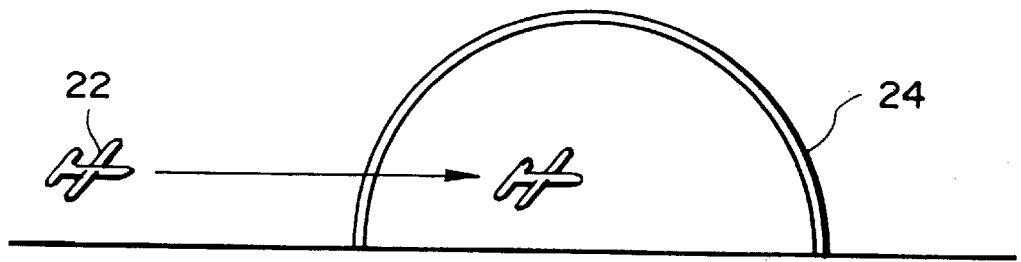

FIG. 4 shows a view illustrating the principle of a second embodiment of the present invention. As in the first embodiment, the second embodiment judges whether the front or back side of a polygon is to be displayed on a screen. If it is judged that the front side of the polygon is to be displayed, a first color palette is referred to through a color code to form image information. More particularly, RGB information to be displayed at objective dots is determined. On the other hand, if it is judged that the back side of the polygon is to be displayed, a second color palette is referred to through a color code to form image information. In such a manner, different color palettes can be used for displaying back and front side of the polygon to be displayed. Thus, for example, the front side of the polygon may be more brightened while the back side of the polygon may be more darkened. Furthermore, colors that are represented by a combination of RGB but cannot be used on representation of the front side of the polygon can be used on representation of the back side of the same object. In FIG. 3B, for example, a polygon forming a dome 24 has the same color code both for the front and back sides thereof, but only a color palette is changed. More particularly, when a moving body 22 is to be moved into the dome 24 and if the back side of the polygon forming the dome 24 is to be displayed, a color palette for representing a more darkened color will be selected. Thus, the dome 24 having a specific color on its outer side may be represented with the more darkened color than the color specified for the outer side when the moving body has entered into the dome 24. This provides a realistic representation without increasing processing load so much.

Figure 5A:
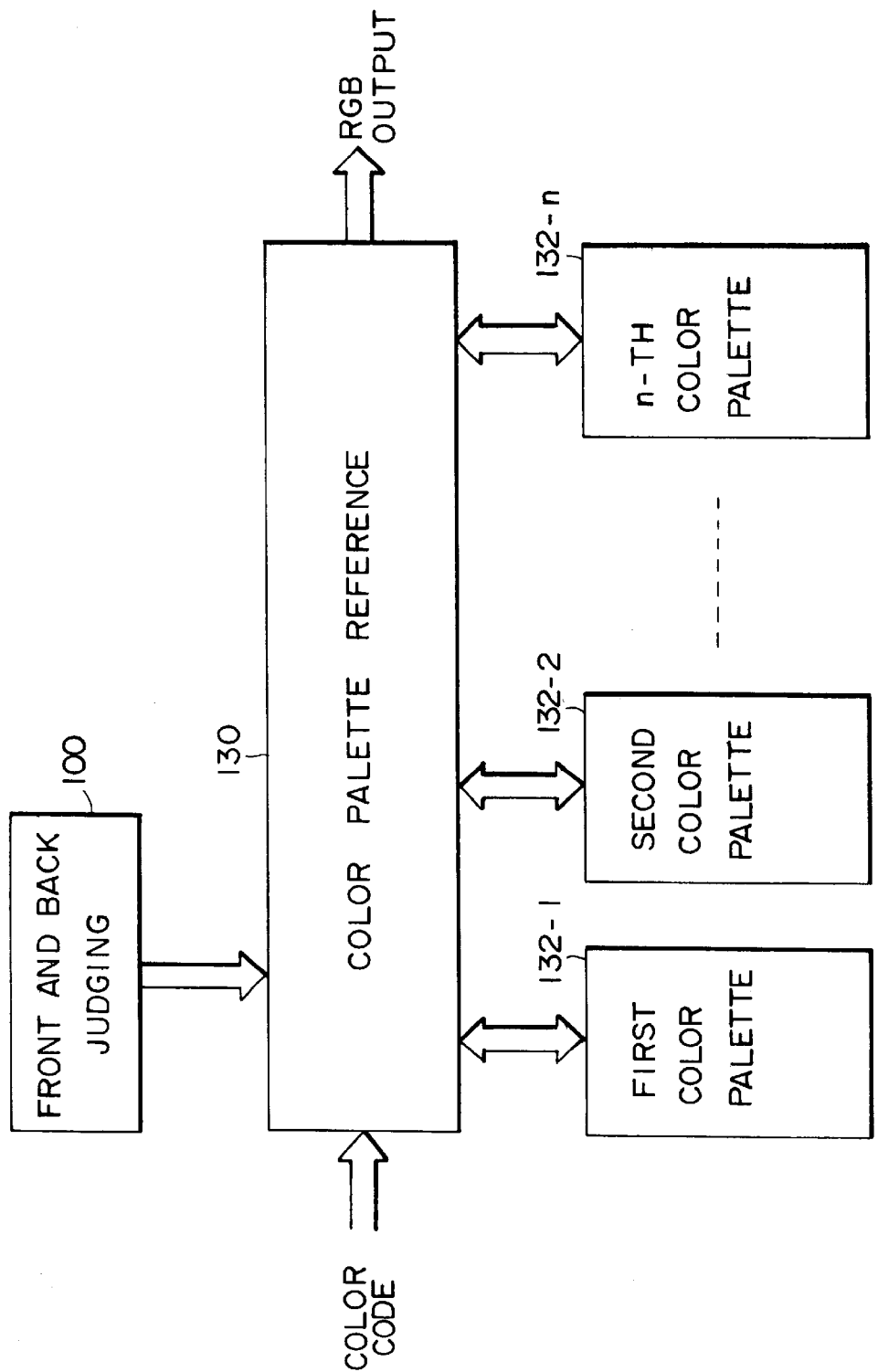

FIGS. 5A and 5B show block diagrams of various configurations which can realize the principle of FIG. 4. The configurations of FIG. 5A first inputs a color code to a color palette reference unit 130. The front and back judging unit 100 then judges whether the front or back side of the polygon is to be displayed. According to the resulting judgment, the color palette reference unit 130 in turn changes a color palette referred to through a color code. If the front side of the polygon is to be displayed, for example, a first color palette 132-1 will be referred to. If the back side of the polygon is to be displayed, a first color palette 132-2 will be referred to. In such a manner, different color palettes to be referred to can be used depending on the side of the polygon to be displayed.

In the configuration of FIG. 5B, each polygon has front and back side palette numbers as polygon information 140. A selector 142 selects either of the front or back side color palette number according to the judgment from the front and back judging unit 100. A color palette reference unit 144 refers to one of the first to n-th color palette numbers (146-1 to 146-n), based on the selected color palette number by the selector 142. For example, when it is judged that the front side of a polygon is to be displayed and a front side color palette number is therefore selected and if this front side color palette number indicates the first color palette 146-1, the first color palette 146-1 will be referred to. When it is judged that the back side of a polygon is to be displayed and a back side color palette number is therefore selected and if this back side color palette number indicates the second color palette 146-2, the second color palette 146-2 will be referred to.

To realize the principle of FIG. 4, any other configuration other than those of FIGS. 5A and 5B may be applied to the present invention if it can refer to different color palettes for the front and back sides of the polygon.

(Third Embodiment)

The third embodiment is such that depending on whether the front or back side of the polygon is to be displayed, at least one of vertex brightness information, normal vector information and lighting model parameter information all of which are used to compute the brightness of a polygon is varied.

Figure 6A:
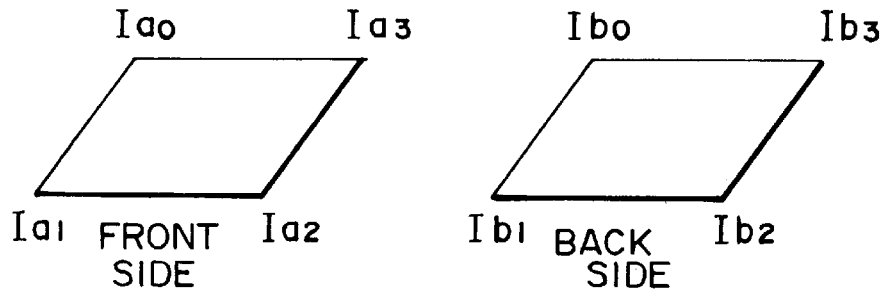
FIGS. 6A to 6D are views illustrating the principle of a third embodiment of the present invention.
Figure 6B:
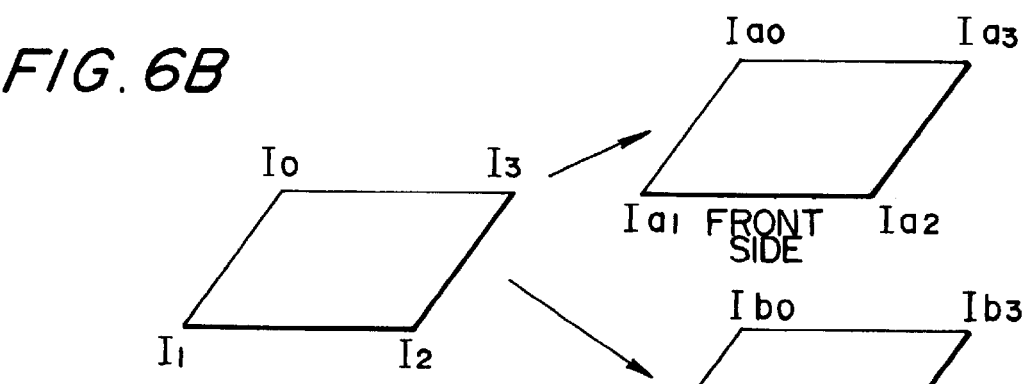

With Gouraud shading, for example as shown in FIG. 6A, vertex brightness information Ia0, Ia1, Ia2 and Ia3 for displaying the front side of a polygon is different from vertex brightness information Ib0, Ib1, Ib2 and Ib3 for displaying the back side of a polygon. Thus, the brightness and shading of the polygon can be varied depending on whether the front or back side of the polygon is to be displayed. This can be accomplished with realistic representation without increasing processing load so much. Technique for varying the vertex brightness information may be provided by causing each polygon to have two types of vertex brightness information Ia0 to Ia3 and Ib0 to Ib3 as one of polygon information. It may also be provided by causing vertex brightness information I0 to I3 as polygon information to be subjected to various computations, thereby obtaining the front and back side vertex brightness information Ia0 to Ia3 and Ib0 to Ib4, as shown in FIG. 6B. For example, addition of a predetermined value to I0 to I3 may generate Ia0 to Ia3 while subtraction of a predetermined value from I0 to I3 may generate Ib0 to Ib3. In such a case, the whole object may be brightened if the front side of the polygon is displayed while the whole object may be darkened if the back side thereof is displayed.

Figure 6C:
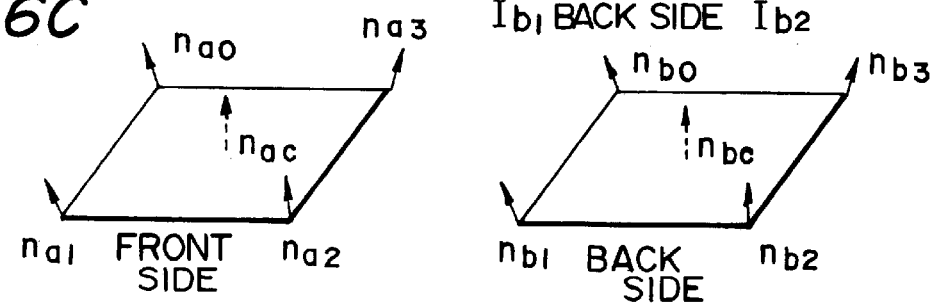
Figure 6D:
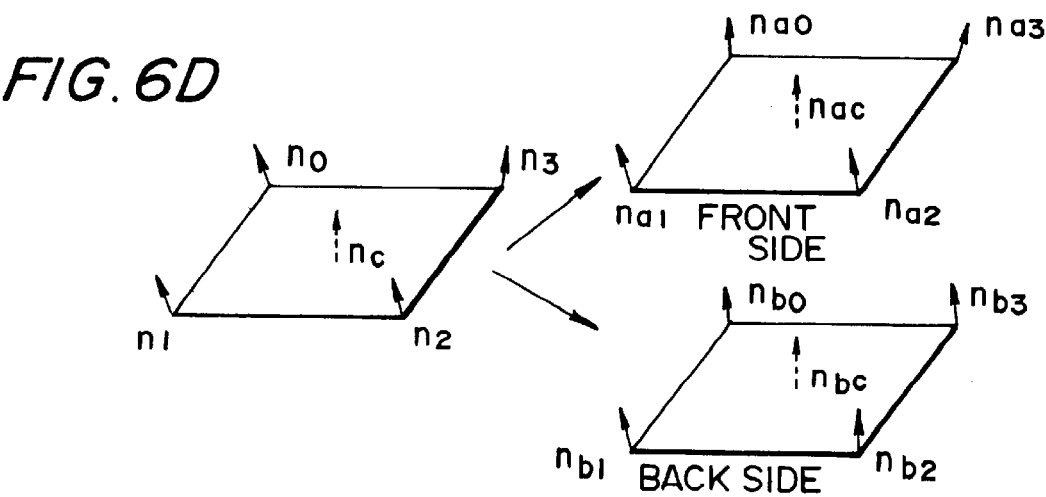

With Phong's smooth shading, for example, as shown in FIG. 6C, normal vector information na0, na1, na2 and na3 (or nac) for displaying the front side of a polygon is different from normal vector information nb0, nb1, nb2 and nb3 (or nbc) for displaying the back side of the polygon. This can also vary the brightness or shading of the polygon depending on whether the front or back side of the polygon is to be displayed. This can also be accomplished with realistic representation and without increasing processing load so much. Technique for varying the normal vector information may be provided by causing each polygon to have two types of normal vector information na0 to na3 (or nac) or nb0 to nb3 (or nbc) as polygon information. It may also be provided by causing normal vector information n0 to n3 (or nc) as polygon information to be subjected to various computations, thereby obtaining normal vector information na0 to na3 (or nac) and nb0 to nb3 (or nbc) for the front and back sides of the polygon, as shown in FIG. 6D.

When vertex brightness information is determined from normal vector information and if this vertex brightness information is used to perform the Gouraud shading process, the normal vector information may be varied depending on whether the front or back side of the polygon is to be displayed.

In place of or together with the vertex brightness information and normal vector information, lighting model parameter information may be varied.

More particularly, a light intensity (i) is generally represented by the following formula:

$$i = pa + pd \times d + ps \times s$$

where ps is a specular (or specular reflection light) component; pa is an ambient (or environment light) component; and pd is a diffuse (or diffuse reflection light) component of a light.

In the above formula, the values d and s may be suitably determined to provide various types of lighting models.

With Lambert shading, for example, a lighting model in which the ambient and diffuse components of a light is only taken on determining the light intensity is used. Such a lighting model can be represented by:

$$i = pa + pd \times d.$$

Figure 7A:
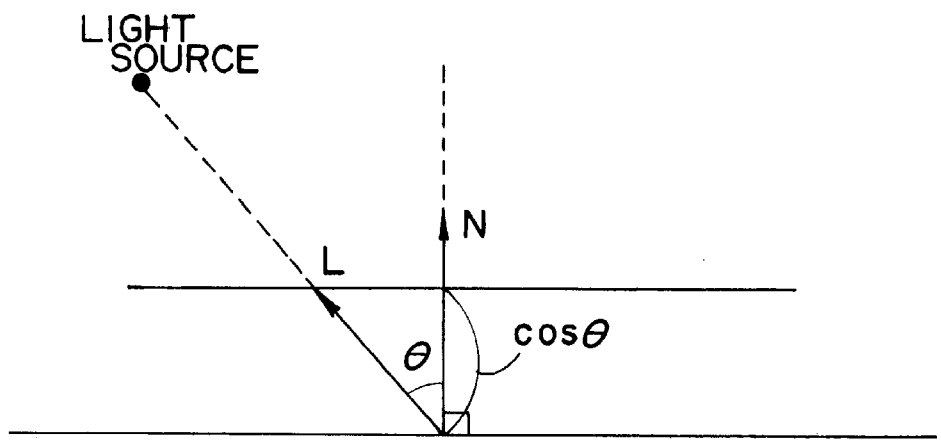
FIGS. 7A and 7B are also views illustrating the principle of the third embodiment.

In such a case, the amount of light incident on the surface of an material per unit area is proportional to COS θ if an angle included between a normal vector N and a light vector L on a plane of FIG. 7A is θ. If COS θ is minus, the amount of light is zero. If the length of the vectors N and L are equal to 1, COS θ can be represented by the dot product of the vector N and L, or N·L. This dot product N·L may be used to determine the coefficient d of the diffuse component as follows:

$$d = \max(0, N \cdot L).$$

This Lambert model is provided by the simplified computation and therefore has been broadly used in the art.

Figure 7B:
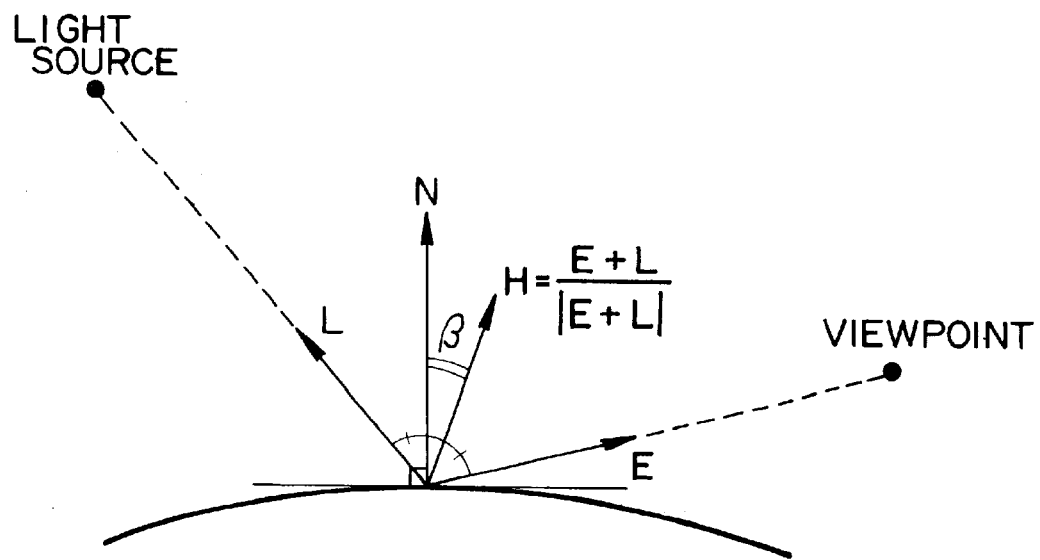

Phong shading which uses a lighting model also using the specular component of the light will now be described. The specular reflection is observed on a surface. Since the surface of an material is rough, the specular reflection has a spread direction. The intensity of the specular reflection increases as an angle β (an angle represented between vectors N and H) of FIG. 7B decreases.

H is equal to (E+L)/|E+L| and is a vector of which direction is half way between the vectors E and L. Since the specular reflection is generated at a portion of the material surface oriented toward the direction H, the intensity of the specular reflection depends on the dot product of the vector H and N. With Phong shading, the coefficients of the diffuse and specular components are represented as follows:

$$d = \max(0, N \cdot L), \text{ and}$$

$$S = (N \cdot H)n.$$

In the above formulae, it is premised that the length of all the vectors N, L and H is equal to 1. In the lower formula, by varying the value n, various ways of spreading the highlight can be obtained.

The other technique for determining the light intensity using the specular, diffuse and ambient components may be any of Blinn shading, etc.

By varying the parameter information such as specular, ambient and diffuse components of the light, light vector and normal vector of the surface in the lighting model as described above, depending on whether the front or back side of the polygon is to be displayed, a single polygon can be used to display the front and back sides of the object with realistic representation.

Figure 11:
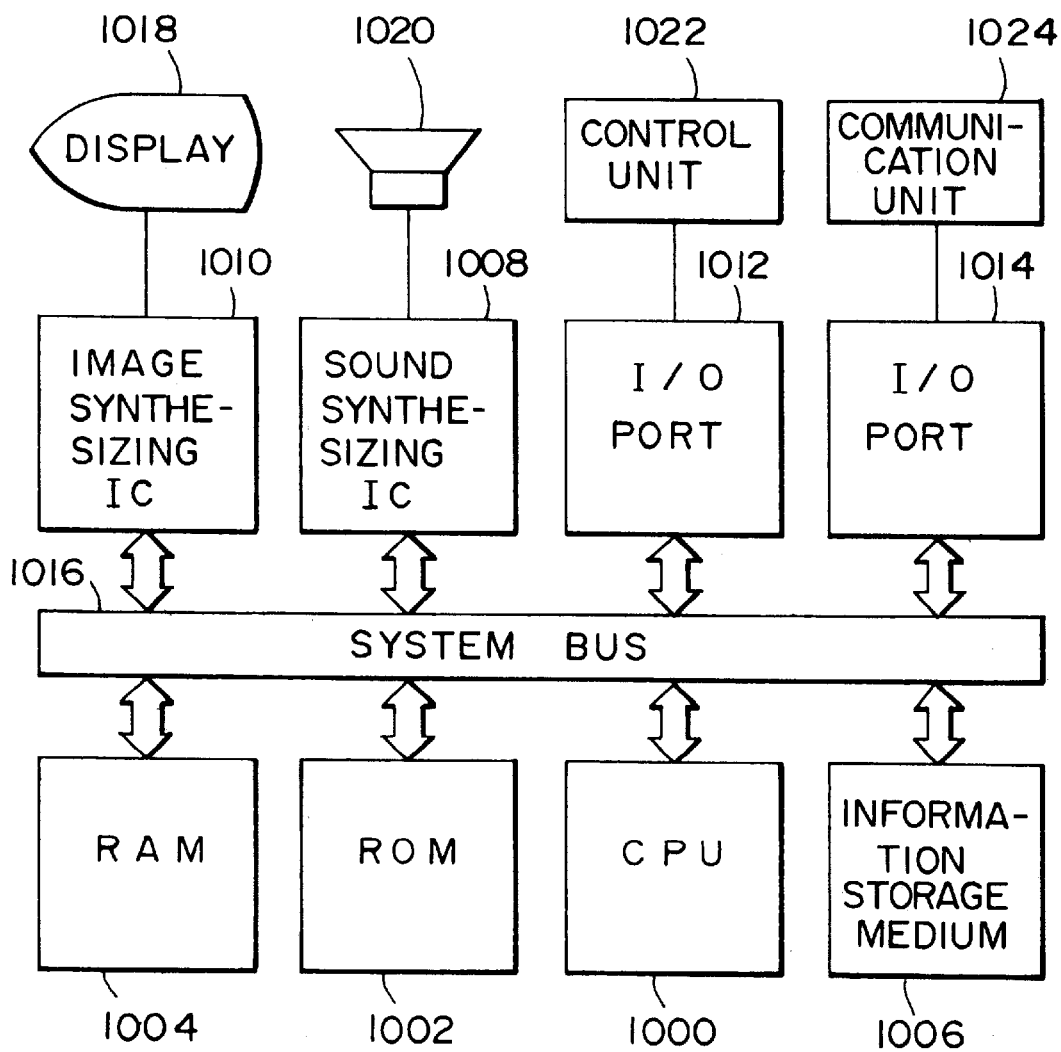
FIG. 11 is a view illustrating a hardware structure for realizing the first to third embodiments.

A hardware configuration for realizing the first to third embodiments will now be described with reference to FIG. 11. In the hardware of FIG. 11, CPU 1000, ROM 1002, RAM 1004, information storage medium 1006, sound synthesizing IC 1008, image synthesizing IC 1010, I/O ports 1012, 1014 are mutually connected through a system bus 1016 for data transmission and reception. The image synthesizing IC 1010 is connected to a display 1018; the sound synthesizing IC 1008 is connected to a speaker 1020; the I/O part 1012 is connected to a control device 1022; and the I/O port 1014 is connected to a communication device 1024.

The information storage medium 1006 mainly stores information such as image and sound information for representing objects to be displayed and may take any of various media such as CD-ROM, game cassette, IC card, DVD, MO, FD and memory. For example, the information storage medium such as CD-ROM, game cassette or DVD is used for a domestic game machine to store a game program and the like. With an arcade game machine, a memory such as ROM may be used. In such a case, the information storage medium 1006 may be the ROM 1002.

A control unit 1022 corresponds to a game controller, an operation panel or the like and serves to input a player's judgment into the main machine body depending on the progress of the game.

According to a program stored in the information storage medium 1006, a system program stored in the ROM 1002 (such as initialized information for the system), an input signal from the control unit 1022 and the like, the CPU 1000 controls the whole system and processes various data. The RAM 1004 is storage means that is used such as a work area for the CPU 1000 and stores the given contents of the information storage medium 1006 and ROM 1002 or the results of computation in the CPU 1000.

A game machine of such a type is generally provided with the sound synthesizing IC 1008 and image synthesizing IC 1010 which can output game sounds and images in a preferable manner. The sound synthesizing IC 1008 is an integrated circuit for synthesizing game sounds such as effect sounds, background music, based on the information which has been stored in the information storage medium 1006 and ROM 1002. The synthesized game sounds are outputted from the game machine through the speaker 1020. The image synthesizing IC 1010 is an integrated circuit for synthesizing pixel information to be outputted toward the display 1018, based on the image information sent from such as the RAM 1004, the ROM 1002, the information storage medium 1006. A so-called head mount display (HMD) can be used as the display 1018.

The communication device 1024 serves to transmit various types of information available within the game machine to any external means or to receive various types of data from the external means. The communication device 1024 may be connected to any other game machine to deliver or receive information between the game machines according to the game program or may deliver or receive information such as game programs through a communication line.

Various processings described in connected with FIGS. 1 to 10B may be accomplished by a given circuit in the image synthesizing IC 1010 or by the CPU 1000 and a given program or by the image synthesizing IC 1010 and a given program.

Figure 12A:
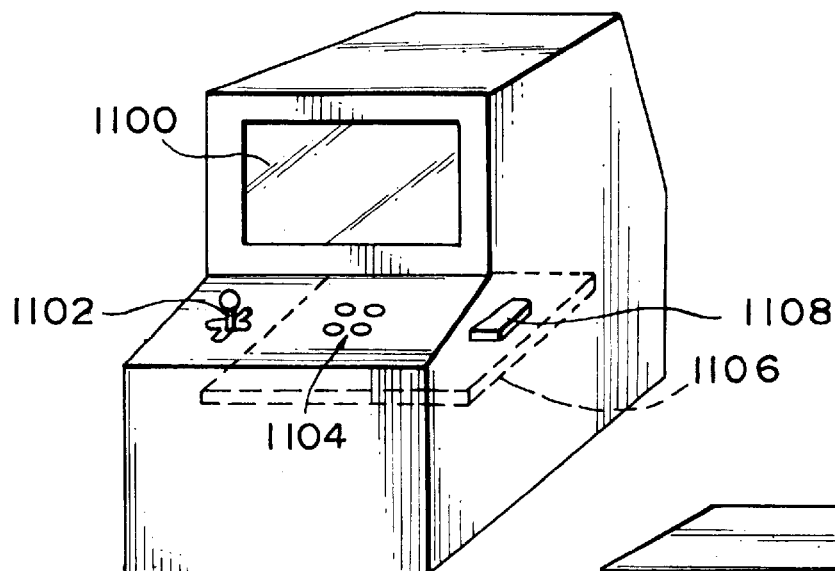
FIGS. 12A, 12B and 12C are views illustrating various types of devices to which the first to third embodiments can be applied.

FIG. 12A shows an arcade game machine to which the first to third embodiments are applied. A player can enjoy a game by manipulating a lever 1102 and buttons 1104 and others while viewing a game picture displayed on a display 1100. An IC board 1106, which itself is included in the game machine, includes CPU, image synthesizing IC, sound synthesizing IC and others which are mounted therein. A memory 1108, which is an information storage medium on the IC board 1106, stores information used for such as judging whether the front or back side of the primitive surface is to be displayed, and information for varying image information used in forming the image of the primitive surface, depending on whether the front or back side of the primitive surface is to be displayed. The information will be referred to "the stored information". The stored information includes at least one of program codes used to perform the aforementioned processings, image information, sound information, shape information of objects to be displayed, table data, list data, player's information and other information.

Figure 12B:
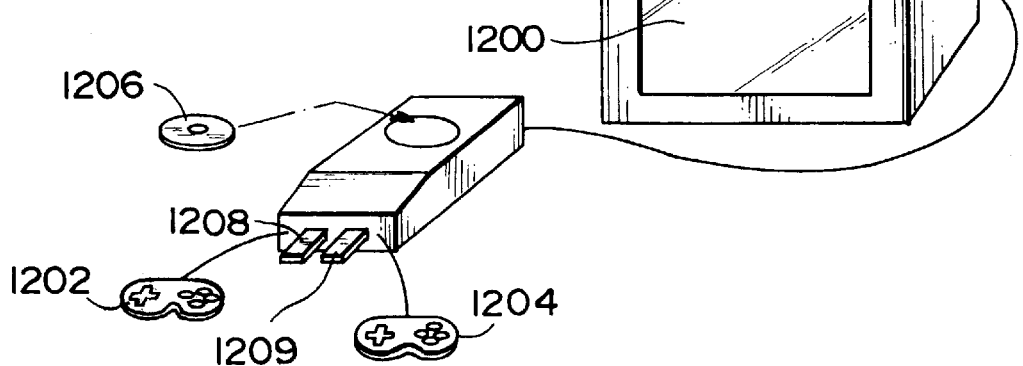

FIG. 12B shows a domestic game machine to which the first to third embodiments are applied. A player can enjoy a game by manipulating game controllers 1202 and 1204 while viewing a game picture displayed on a display 1200. In this case, the aforementioned stored information have been stored in a information storage media which is able to set up to and detach from the game machine such as CD-ROM 1206, IC card 1208 and 1209.

Figure 12C:
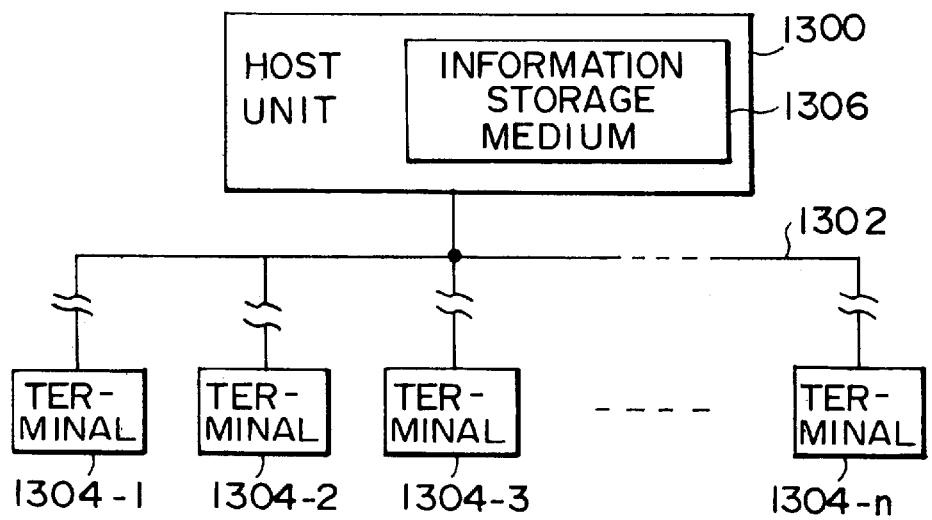

FIG. 12C shows a game machine to which the first to third embodiments are applied and which includes a host unit 1300 and terminals 1304-1 to 1304-n connected to the host unit 1300 through a communication line 1302. In this case, the stored information described above have been stored in an information storage medium 1306 such as a magnetic disc unit, a magnetic tape unit and a memory controllable by the host unit 1300, for example. Where each of the terminals 1304-1 to 1304-n includes a CPU, an image synthesizing IC and a sound synthesizing IC and can be stand-alone for synthesizing game images and game sounds, the host unit 1300 delivers game programs or the like for synthesizing the game images and game sounds to the terminals 1304-1 to 1304-n. On the other hand, if the terminals are not stand-alone for synthesizing, the host unit 1300 will synthesize the game images and game sounds which are in turn transmitted to and outputted from the terminals 1304-1 to 1304-n.

The present invention is not limited to the aforementioned first, second and third embodiments, but may be carried out in various different forms.

In the first to third embodiments of the present invention, the texture for mapping, the color palette to be referred to, the brightness information or the like is varied depending on whether the front or back side of the primitive surface is to be displayed. However, the present invention is not limited to these embodiments, but it may be applied to such a configuration at least that the image information used to form the image of a primitive surface is varied depending on whether the front or back side of the primitive surface is to be displayed. In this case, the image information may include various information such as texture information, information for determining texture, color palette information, information for determining color palette, brightness information, information for determining brightness, transparency information and information for determining transparency.

Technique for varying the texture, color palette or brightness is not limited to those of the first to third illustrated embodiments.

The present invention may be applied to various game machine forms such as domestic game machines, arcade game machines, game machines of such a type that a game software is delivered to them through a communication line, attraction game machines, driving simulators, flight simulators.

Figure 8A:
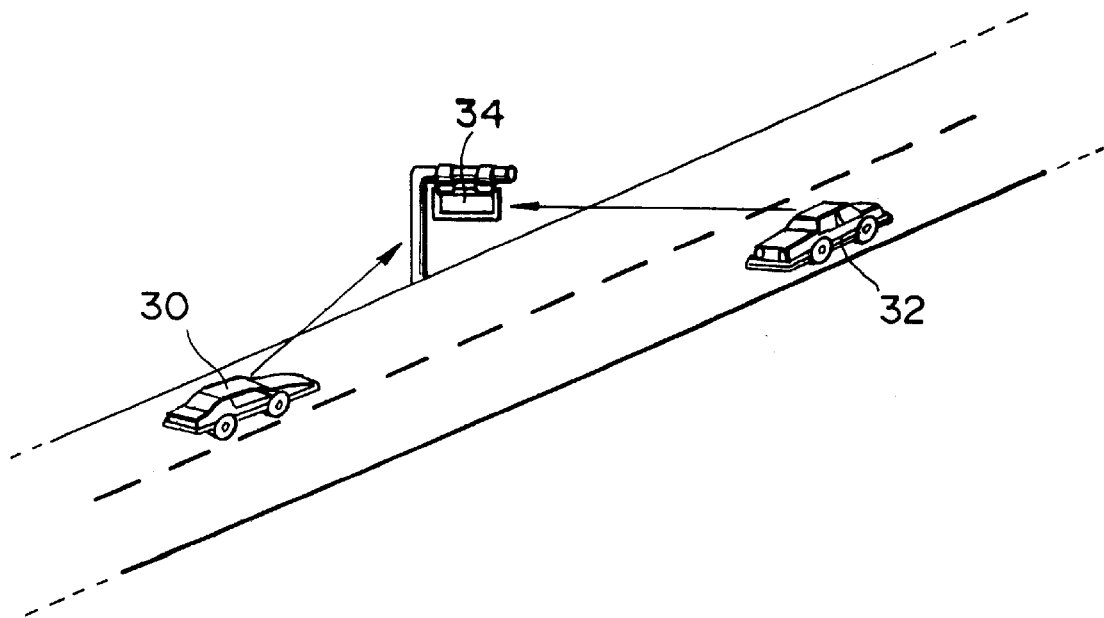
FIGS. 8A, 8B and 8C are views illustrating images synthesized according to the present invention.
Figure 8B:
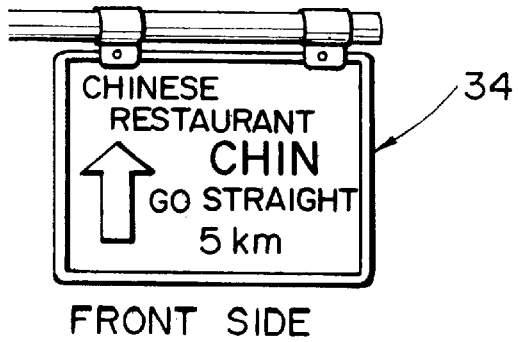
Figure 8C:
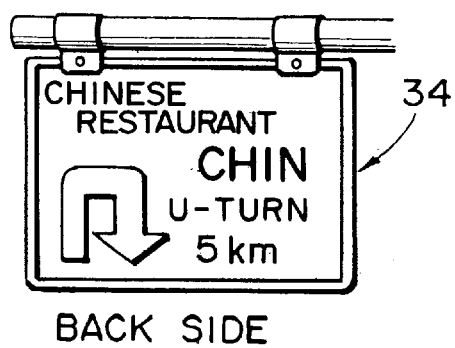

The present invention can synthesize various images. In the racing car game shown in FIG. 8A, for example, the signboard polygon 34 may be synthesized into a form as viewed from the racing car 30 and another form as viewed from the other racing car 32. As shown in FIGS. 8B and 8C, the front side of the signboard polygon 34 viewed from the racing car 30 may be displayed on a screen while the back side of the signboard polygon 34 viewed from the racing car 32 may be displayed on the screen. A Chinese restaurant guided by the signboard must be displayed with its front or back side thereof since this shop is in the straight direction from the racing car 30 and also in the turned direction from the racing car 32. According to the present invention, such a change between the front and back sides of the signboard in the viewed direction can be accomplished without increasing processing load so much since a single polygon is used to realize the front or back side of the polygon, as shown in FIGS. 8B and 8C. More particularly, it is judged that the front side of the signboard polygon 34 is to be displayed as it is viewed from the racing car 30. Thus, a front side texture is mapped on the sign board and a front side color palette is used. The brightness thereof is computed using a front side information. On the other hand, if the signboard polygon 34 is viewed from the racing car 32, it is judged that the back side of the signboard polygon 34 is to be displayed. Thus, a back side texture is mapped on the signboard polygon and a back color palette is used. The brightness thereof is also computed using a back side information.

Figure 9:
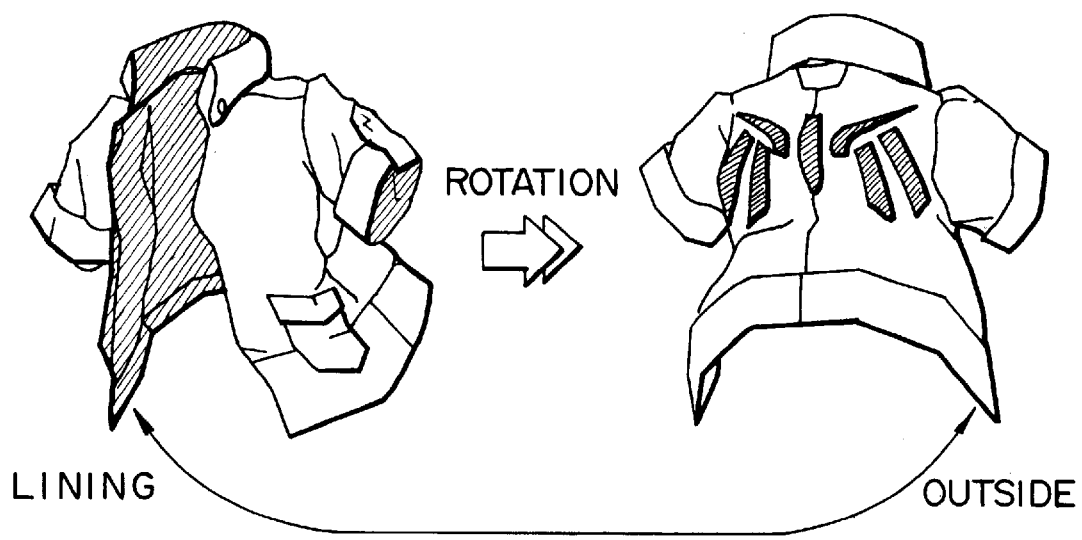
FIG. 9 is a view illustrating an image synthesized according to the present invention.

In addition, for example, the present invention can easily represent the outside or lining of a garment, as shown in FIG. 9. In such a case, the texture, color palette, brightness and the like may be varied depending on whether the front or back side of the polygon forming the garment is to be displayed.

Figure 10A:
FIGS. 10A and 10B are also views illustrating images synthesized according to the present invention.
Figure 10B:
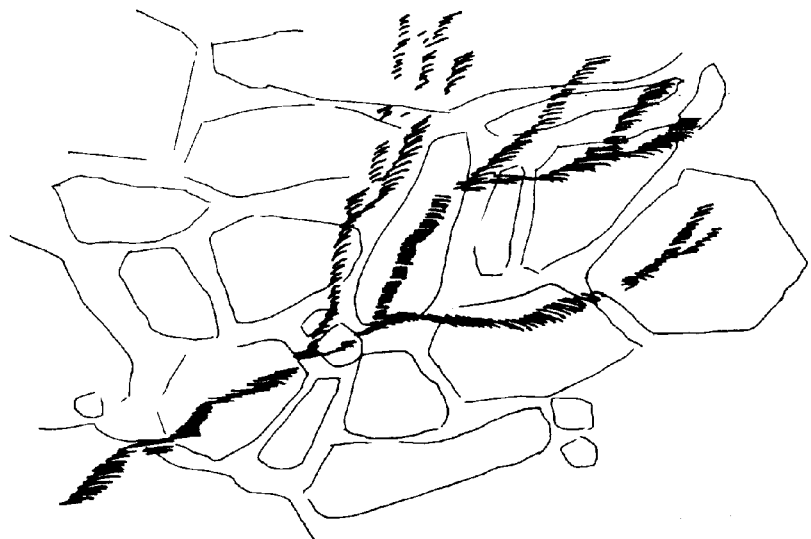

Moreover, according to the present invention, the representation of such a water surface as shown in FIGS. 10A and 10B can be easily accomplished. FIG. 10A shows an image when the water surface is viewed from above, and FIG. 10B shows an image when the water surface is viewed from thereunder (or from the underwater). In such a case, it is desirable that the transparency in addition to the texture, color palette and brightness are varied. In other words, the transparency is decreased as the water surface is viewed from above while the transparency is increased as the water surface is viewed from under. Thus, the bottom of the water may be less viewed as the water surface is viewed from above. When the water surface is viewed from under, a tree located above the water surface may be displayed on the water surface. For example, if it is assumed that the color of a transparent (or translucent) object is C1 and the color of the background is C2, the whole color can be represented by C=tC2+(1−t)C1. The transparency may be varied by varying the above value t depending on whether the water surface is viewed from above or under. In order to provide a distorted image of the tree disturbed by waves, the normal vector information used to represent the condition of the waved surface may be varied depending on whether the water surface is viewed from above or under.

In addition, the present invention can represent various other representation such as an object projected onto a mirror or window glass, the color or nerves of a leaf different depending on whether the front or back side of that leaf is to be displayed, the internal structure of an object (e.g., the inside of a bonnet in a crushed car), the wings of an airplane, the front and back sides of one page in a book, a flag fluttered by the wind and a fan.

What is claimed is:

1. An image synthesizing apparatus for generating an image including objects, each of which is formed by at least one primitive surface, comprising:

judging means for judging whether the front or back side of said at least one primitive surface should be displayed on a screen; and mapping means for mapping a first texture to said at least one primitive surface when the front side thereof is to be displayed and for mapping a second texture to said at least one primitive surface when the back side thereof is to be displayed.

2. The image synthesizing apparatus according to claim 1, wherein said at least one primitive surface is a polygon.

3. The image synthesizing apparatus of claim 1, wherein the means for judging judges whether the front side or the back side of the primitive surface should be displayed based on at least one of:
   vertex orientation information that identifies whether vertices of the primitive surface are oriented clockwise or counterclockwise, and
   vector product information that identifies a vector product of vertex coordinates with respect to a positive or negative z-coordinate system.

4. An image synthesizing apparatus for generating an image including objects, each of which is formed by at least one primitive surface, comprising:
   judging means for judging whether the front or back side of said at least one primitive surface should be displayed on a screen; and
   forming means for forming an image of said at least one primitive surface by referring to a first color palette through a color code when the front side of said at least one primitive surface is to be displayed and for forming an image of said at least one primitive surface by referring to a second color palette through a color code when the back side of said at least one primitive surface is to be displayed.

5. The image synthesizing apparatus according to claim 4, wherein said at least one primitive surface is a polygon.

6. The image synthesizing apparatus of claim 4, wherein the means for judging judges whether the front side or the back side of the primitive surface should be displayed based on at least one of:
   vertex orientation information that identifies whether vertices of the primitive surface are oriented clockwise or counterclockwise, and
   vector product information that identifies a vector product of vertex coordinates with respect to a positive or negative z-coordinate system.

7. An image synthesizing apparatus for generating an image including objects, each of which is formed by at least one primitive surface, comprising:
   judging means for judging whether the front or back side of said at least one primitive surface should be displayed on a screen; and
   computing means for computing the brightness of said at least one primitive surface by using at least one of vertex brightness information, normal vector information and lighting model parameter information and for varying said brightness information, said normal vector information and said lighting model parameter information depending on whether the front or back side of said at least one primitive surface is to be displayed.

8. The image synthesizing apparatus according to claim 7, wherein said at least one primitive surface is a polygon.

9. The image synthesizing apparatus of claim 7, wherein the means for judging judges whether the front side or the back side of the primitive surface should be displayed based on at least one of:
   vertex orientation information that identifies whether vertices of the primitive surface are oriented clockwise or counterclockwise, and
   vector product information that identifies a vector product of vertex coordinates with respect to a positive or negative z-coordinate system.

10. An image synthesizing apparatus for generating an image including objects, each of which is formed by at least one primitive surface, comprising:
    judging means for judging whether the front or back side of said at least one primitive surface should be displayed on a screen; and
    means for varying image information used to form an image of said at least one primitive surface depending on whether the front or back side of said at least one primitive surface is to be displayed.

11. The image synthesizing apparatus according to claim 2, wherein said image information includes at least one of texture information, information for determining texture, color palette information, information for determining color palette, brightness information, information for determining brightness, transparency information and information for determining transparency.

12. The image synthesizing apparatus according to claim 2, wherein said at least one primitive surface is a polygon.

13. The image synthesizing apparatus of claim 10, wherein the means for judging judges whether the front side or the back side of the primitive surface should be displayed based on at least one of:
    vertex orientation information that identifies whether vertices of the primitive surface are oriented clockwise or counterclockwise, and
    vector product information that identifies a vector product of vertex coordinates with respect to a positive or negative z-coordinate system.

14. An image synthesizing method for generating an image including objects, each of which is formed by at least one primitive surface, comprising the steps of:
    judging whether the front or back side of said at least one primitive surface is to be displayed on a screen; and
    varying image information used to form the image of said at least one primitive surface depending on whether the front or back side of the at least one primitive surface is to be displayed.

15. The image synthesizing method according to claim 14, wherein said image information includes at least one of texture information, information for determining texture, color palette information, information for determining color palette, brightness information, information for determining brightness, transparency information and information for determining transparency.

16. The image synthesizing method according to claim 14, wherein said at least one primitive surface is a polygon.

17. The method of claim 14, wherein the image information includes at least one of color palette information, brightness information and transparency information.

18. An information storage medium for generating an image including objects, each of which is formed by at least one primitive surface, comprising:
    information used to judge whether the front or back side of the at least one primitive surface is to be displayed on a screen; and
    information used to vary image information used to form an image of said at least one primitive surface depending on whether the front or back side of the at least one primitive surface is to be displayed.

19. The information storage medium according to claim 18, wherein said image information includes at least one of texture information, information for determining texture, color palette information, information for determining color palette, brightness information, information for determining brightness, transparency information and information for determining transparency.

20. The information storage medium according to claim 18, wherein said at least one primitive surface is a polygon.

* * * * *